United States Patent
Schmitt et al.

(10) Patent No.: US 12,054,173 B2
(45) Date of Patent: Aug. 6, 2024

(54) VEHICLE LOCATION USING COMBINED INPUTS OF REDUNDANT LOCALIZATION PIPELINES

(71) Applicant: Motional AD LLC, Boston, MA (US)

(72) Inventors: Paul Schmitt, Merrimack, NH (US); Yimu Wang, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 207 days.

(21) Appl. No.: 17/443,433

(22) Filed: Jul. 26, 2021

(65) Prior Publication Data

US 2023/0027369 A1    Jan. 26, 2023

(51) Int. Cl.
*B60W 60/00* (2020.01)
*G01C 21/16* (2006.01)
*G06F 18/214* (2023.01)
*G06N 20/00* (2019.01)
*H04W 4/46* (2018.01)

(52) U.S. Cl.
CPC ....... *B60W 60/001* (2020.02); *G01C 21/1652* (2020.08); *G06F 18/214* (2023.01); *G06N 20/00* (2019.01); *H04W 4/46* (2018.02); *B60W 2420/403* (2013.01); *B60W 2420/408* (2024.01)

(58) Field of Classification Search
CPC .......... B60W 60/001; B60W 2420/42; B60W 2420/52; H04W 4/46; G06N 20/00; G01C 21/1652; G06F 18/214
See application file for complete search history.

(56) References Cited

U.S. PATENT DOCUMENTS

| 5,906,655 A | 5/1999 | Fan |
| 2010/0063664 A1* | 3/2010 | Anderson ............ G05D 1/0272 701/23 |
| 2010/0169005 A1 | 7/2010 | Guillet et al. |
| 2014/0336983 A1 | 11/2014 | Steinhardt et al. |

(Continued)

FOREIGN PATENT DOCUMENTS

| JP | 2009-257763 A | 11/2009 |
| JP | 2009-257892 A | 11/2009 |

(Continued)

OTHER PUBLICATIONS

JP2009257763A machine translation (Year: 2009).*

(Continued)

*Primary Examiner* — Anne Marie Antonucci
*Assistant Examiner* — Jingli Wang
(74) *Attorney, Agent, or Firm* — Knobbe, Martens, Olson & Bear, LLP

(57) ABSTRACT

Provided are methods for semantic annotation of sensor data using unreliable map annotation inputs, which can include training a machine learning model to accept inputs including images representing sensor data for a geographic area and unreliable semantic annotations for the geographic area. The machine learning model can be trained against validated semantic annotations for the geographic area, such that subsequent to training, additional images representing sensor data and additional unreliable semantic annotations can be passed through the neural network to provide predicted semantic annotations for the additional images. Systems and computer program products are also provided.

21 Claims, 7 Drawing Sheets

(56) References Cited

U.S. PATENT DOCUMENTS

| | | | |
|---|---|---|---|
| 2017/0227970 A1* | 8/2017 | Taguchi | ................ G01S 19/485 |
| 2019/0293435 A1* | 9/2019 | Mori | ..................... G01S 13/867 |
| 2020/0081136 A1 | 3/2020 | Wang | |
| 2020/0353923 A1* | 11/2020 | Perrin | .................. G05D 1/0246 |
| 2021/0048540 A1 | 2/2021 | Miller et al. | |

FOREIGN PATENT DOCUMENTS

| | | | | |
|---|---|---|---|---|
| JP | 2009257763 A | * | 11/2009 | ............... G01S 5/00 |
| JP | 2009257892 A | * | 11/2009 | |
| JP | 2017-138282 A | | 8/2017 | |
| JP | 2019-168432 A | | 10/2019 | |

OTHER PUBLICATIONS

JP2009257892A machine translation (Year: 2007).*
Office Action in KR Application No. 10-2021-0140071 dated Sep. 20, 2022.
Office Action in GB Application No. 2113837.5 dated Jun. 7, 2022.
Notice of Allowance issued in Korean Application No. 10-2021-0140071, dated Mar. 28, 2023.

* cited by examiner

VEHICLE LOCATION USING COMBINED INPUTS OF REDUNDANT LOCALIZATION PIPELINES

BACKGROUND

Self-driving vehicles typically use multiple types of images to perceive the area around them. Training these systems to accurately perceive an area can be difficult and complicated.

DETAILED DESCRIPTION

Figure 1:
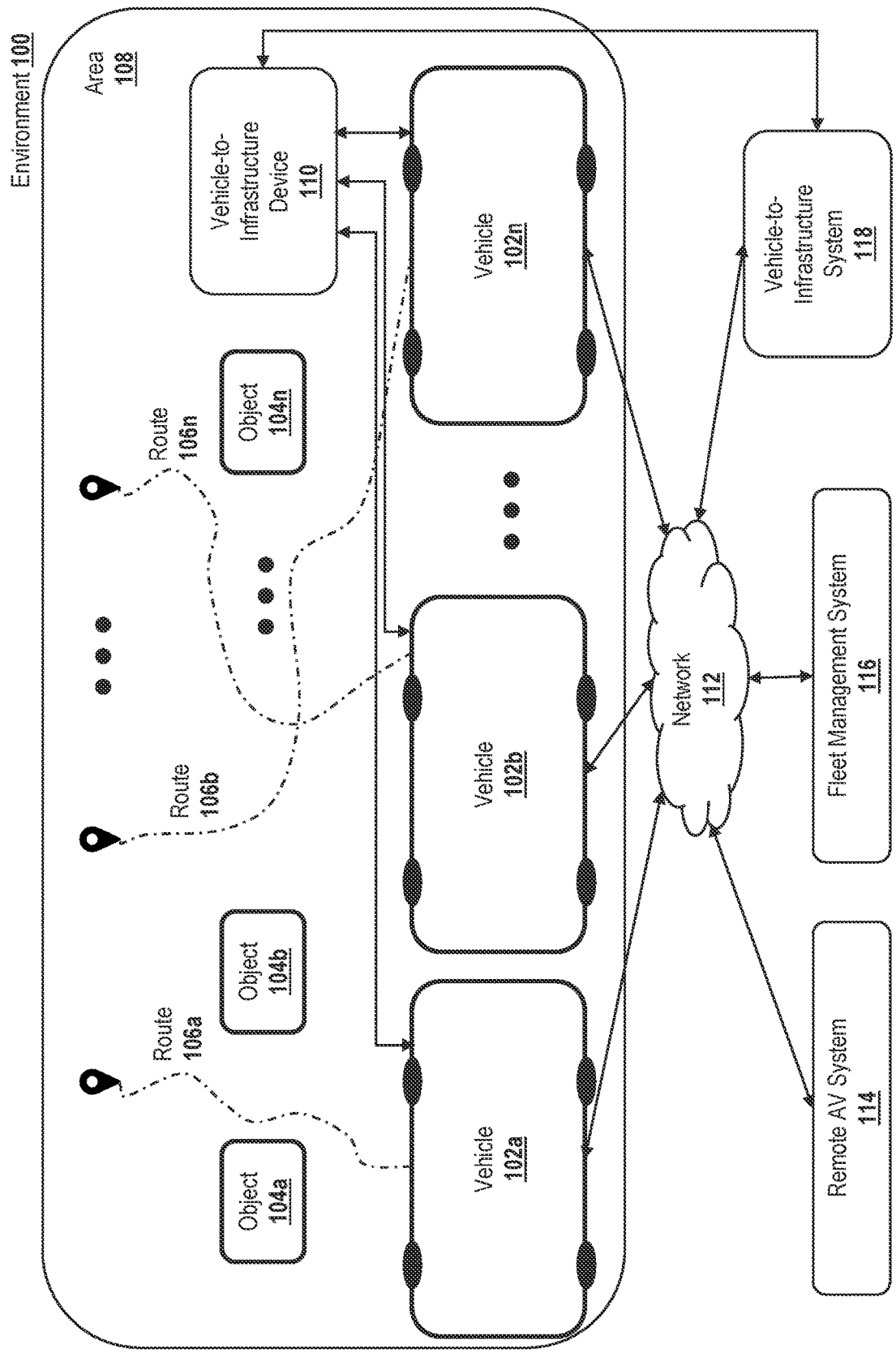
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. Also, the term "or" is used in its inclusive sense (and not in its exclusive sense) so that when used, for example, to connect a list of elements, the term "or" means one, some, or all of the elements in the list. Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

In some aspects and/or embodiments, systems, methods, and computer program products described herein include and/or implement vehicle location using combined inputs of redundant localization pipelines. Generally described, a localization pipeline utilizes data from one or more sensors, such as radar, LiDAR, accelerometers, and the like, to determine a location of a device, such as a self-driving motorized vehicle. As will be appreciated by one skilled in the art, accurate location determination may be critical to a number of functions of a self-driving vehicle, such as route planning and object avoidance. These functions, in turn, can be of critical safety importance. Thus, it may be highly desirable to provide for accurate and resilient localization in a variety of contexts.

While localization systems exist, each typically has one or more drawbacks. For example, dead-reckoning based systems can utilize vehicle odometry, such as speed and steering inputs, to estimate vehicle location from a starting point. These systems are typically susceptible to drift, as errors compound over time. LiDAR based systems, in which LiDAR inputs are compared to a known map of data points, can in many cases be highly accurate, but may be subject to temporary "blips", in which LiDAR sensor data seems to indicate a rapid change in location, leaving the true location unknown. Radar based systems are subject to similar concerns, and tend to be less accurate than LiDAR systems. Global positioning systems (GPS) tend to have varying accuracy, are not always available in a given location, and are subject to security concerns (given the potential, e.g., for spoofing of GPS signals). In short, at present it may be that no individual localization system provides for the accuracy and resiliency required in a given context, such as self-driving vehicles. Moreover, individual localization systems tend to represent a "single point of failure" that presents safety challenges in many situations. While these systems might be modified to provide redundancy, this redundancy does not reduce the flaws inherent the individual system, and may instead multiple them.

Embodiments of the present disclosure address the above-noted problems by providing for vehicle location using combined inputs of redundant localization pipelines. As discussed herein, a vehicle can implement at least two (and potentially more) distinct localization pipelines. In one embodiment, each localization pipeline determines a vehicle location based on a distinct set of sensor data. For example, a first pipeline may determine location based on LiDAR data, a second may determine location based on radar data, a third based on dead reckoning, etc. The vehicle may then compare outputs of each localization pipeline (e.g., representing a predicted location of the vehicle) and combine these outputs to provide a predicted vehicle location.

In some embodiments, the vehicle can utilize the outputs of each pipeline to validate outputs of other pipelines. For example, the vehicle may determine that location can be accurately predicted so long as a threshold number of pipelines output a location a threshold distance of one another. Illustratively, where LiDAR- and radar-based pipelines are implemented, the vehicle may determine that location can be accurately predicted when the outputs of both pipelines are within a given threshold, such as 5 centimeters, 10 centimeters, 1 meter, etc. Where three or more pipelines are implemented, the vehicle may determine that location can be accurately predicted when outputs of at least two of the three pipelines output a location within a given threshold of one another. More generally, the system may determine that location can be accurately predicted when n of m pipelines provide a location within a threshold distance of one another. In other embodiments, each pipeline may be weighted or scored according to a predicted accuracy or reliability of the output of that pipeline, and the system may determine that location can be accurately predicted so long as a total score or weight among all pipelines who "agree" as to current location is a threshold amount. "Agreement" may indicate, for example, that pairwise comparisons between each pair of outputs results in a value below a threshold distance. In another example, agreement may indicate that two outputs are within a threshold distance of a third location, such as a centroid of all outputs that are within a threshold distance of one another.

In some embodiments, other factors, such as vehicle speed, location crowdedness, lane width, and the like may be used to modify the threshold. For example, in an open field without nearby objects and traveling at a relatively low speed (e.g., 5 km/h), a relatively high threshold may be set (e.g., 1 meter). When traveling in a crowded traffic path with narrow lanes at a higher rate of speed (e.g., 100 km/h), a relatively low threshold may be set (e.g., 5 or 10 centimeters). In still other embodiments, the threshold may vary according to the localization pipelines being compared. For example, a relatively low threshold may be set for comparison of pipelines with high expected accuracy, and a relatively high threshold may be set for a comparison of pipelines with low expected accuracy. In some instances, the threshold may vary for each pair of pipelines being compared (e.g., based on an average expected accuracy of both pipelines). In still more embodiments, the threshold may be set based on an amount of time or a number of intervals since last establishing a location. For example, the threshold may be increased when location has not been set for a longer period of time, to account for example for cumulative error in dead reckoning-based localization.

In the instance that location cannot be determined within the threshold accuracy (e.g., when a sufficient number of pipelines do not indicate a location within the threshold distance), the vehicle may be programmed to enter an error state and/or take ameliorative action, such as issuing a warning to a human operator, slowing the vehicle, steering to a safe location, etc. In some instances, the type of ameliorative action taken (or whether such action is taken) is based on a duration since a last predicted location was provided with sufficient accuracy. For example, ameliorative action may be taken only when vehicle location cannot be accurately determined (e.g., according to the criteria above) for at least a threshold period, such as 2 seconds, 5 seconds, 10 seconds, etc. Similarly to the threshold distance, the threshold period may be based on factors such as speed, crowdedness, lane width, and the like. In some cases, use of a dynamic threshold period (based, e.g., on the factors noted above) can account for known issues with localization pipelines. For example, the system may continue to function even when a LiDAR-based pipeline experiences a temporary "blip" in operation.

When the vehicle determines that a location can be predicted with sufficient accuracy, the vehicle can then set the predicted location based on the outputs of the various pipelines. In some embodiments, the predicted location may be selected from among those provided by the various pipelines, based on factors such as expected accuracy of outputs of the pipelines, past vehicle locations, and the like. For example, where one pipeline implements LiDAR-based localization and another implements radar-based localization, the vehicle may be configured to generally select the location provided by the LiDAR-based pipeline, as the expected accuracy of the LiDAR-based pipeline may be higher than the radar-based pipeline. In cases where three or more pipelines are used, the predicted location may be set based on those pipelines whose output has been validated (e.g., as being within the required threshold distance of one another). For example, where LiDAR-based, radar-based, and dead reckoning-based pipelines, are implemented, and two of those three pipelines "agree" as to the general location of the vehicle, the predicted location may be set based on the more accurate of the two agreeing pipelines. In other embodiments, the predicted location may be set based on an aggregate of the output of multiple pipelines, such as an average location. The average may be weighted, for example, based on the expected accuracy of outputs of each pipeline.

In one embodiment, the multiple localization pipelines implemented on a vehicle includes at least one dead reckoning-based pipeline, which determines a location based on a combination of set point (e.g., a past location) and movement data relative to the set point. As noted above, dead reckoning-based pipelines are often subject to drift, by which accuracy reduces relative to distance from the set point. In some embodiments, the set point for the dead reckoning-based pipeline is modified based on a predicted location, as determined from the multiple localization pipelines. For example, the set point may be updated at each localization interval (e.g., each time localization is conducted) so long as criteria for a predicted location is satisfied. In one embodiment, the set point update criteria match the criteria for accurately determining location (e.g., that n of m pipelines establish distances within a threshold distance of one another). In another embodiment, the set point update criteria differ from the criteria for accurately determining location. For example, a vehicle may be configured to update a dead reckoning set point only when a sufficiently accurate location can be predicted independent of a dead reckoning pipeline. Illustratively, where a vehicle implements LiDAR-based, radar-based, and dead reckoning-based pipelines, the vehicle may update a dead reckoning setpoint only when both the LiDAR-based and radar-based pipelines indicate locations within a threshold distance of one another. For vehicles with more than 3 pipelines, the dead reckoning setpoint may be updated when at least n of m non-dead-reckoning-based pipelines indicate locations within a threshold distance of one another.

Determining location based on multiple independent and redundant localization pipelines has substantial benefits. For example, embodiments described herein can address deficiencies in individual localization techniques, leveraging the strengths of individual techniques to overcome the deficiencies of others. Illustratively, drift in dead reckoning-based systems can be addressed by the accuracy of other systems, such as LiDAR-based localization systems. Temporary "blips" in LiDAR-based systems can be addressed by the precision of other systems, such as dead reckoning-based systems. The "single point of failure" experienced by vehicles implementing a single localization pipeline is addressed by use of multiple independent and redundant pipelines. Accordingly, and as will be appreciated by one of skill in the art in light of the present disclosure, the embodiments disclosed herein improve the ability of computing systems, such as computing devices included within or supporting operation of self-driving vehicles, to conduct localization. Moreover, the presently disclosed embodiments address technical problems inherent within computing systems; specifically, the difficulty of programmatically determining localization. These technical problems are addressed by the various technical solutions described herein, including the use of combined inputs of redundant localization pipelines to determine vehicle location. Thus, the present disclosure represents an improvement in localization systems and computing systems in general.

While examples are provided herein with reference to specific localization pipelines (e.g., LiDAR-based, radar-based, dead reckoning-based, etc.), embodiments of the present disclosure may use any combination of various localization pipelines. Additionally examples of localization pipeline types include GPS-based localization, landmark-based localization, camera-based localization, simultaneous location and mapping (SLAM) localization including Video SLAM (VSLAM) localization, acoustic (e.g., sound-based) localization, and accelerometer-based localization. Broadly, such localization pipelines may in some cases be conceptually divided into two types: global localization pipelines and relative localization pipelines. Generally described, a global localization pipeline may implement global localization, which attempts to determine a location of a vehicle within a known space (e.g., a map of a given area). For example, LiDAR- and radar-based pipelines, along with GPS-based pipelines, may implement global localization. In contrast, relative localization pipelines may implement relative localization, which attempts to determine a location of a vehicle relative to another point (e.g., by determining that the vehicle has moved a given distance from the other point).

For example, dead reckoning and VSLAM-based pipelines may implement relative localization. Any combination of such pipelines may be used to provide redundant and resilient localization, in accordance with embodiments of the present disclosure. In some instances, a combination of global and relative localization-based pipelines may be implemented, for example, to leverage strengths of each type of pipeline while counteracting weaknesses.

While some embodiments of the present disclosure relate to predicting location based on redundant and independent localization pipelines, other embodiments may apply the same or substantially similar techniques to predict pose of a vehicle. As used herein, "pose" indicates data points such as the relative direction of a vehicle. Pose may be an important component of various self-driving systems, along with localization. Moreover, the localization pipelines disclosed herein may in some cases also provide pose estimates. The multiple pose estimates provided by the various pipelines may be combined in a manner similar to localization estimates, e.g., such that pose is predicted when a sufficient number of pipelines provide estimates within a threshold distance of one another. Similarly, the techniques described herein may in some embodiments be used to estimate vehicle velocity, e.g., such that a velocity is predicted when a sufficient number of pipelines provide estimates within a threshold distance of one another. Thus, it should be understood that the techniques described herein with reference to location may additionally or alternatively be implemented to predict vehicle pose, velocity, or any combination thereof.

The foregoing aspects and many of the attendant advantages of this disclosure will become more readily appreciated as the same become better understood by reference to the following description, when taken in conjunction with the accompanying drawings.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like. Protocols and components for communicating via the Internet or any of the other aforementioned types of communication networks are known to those skilled in the art and, thus, are not described in more detail herein.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
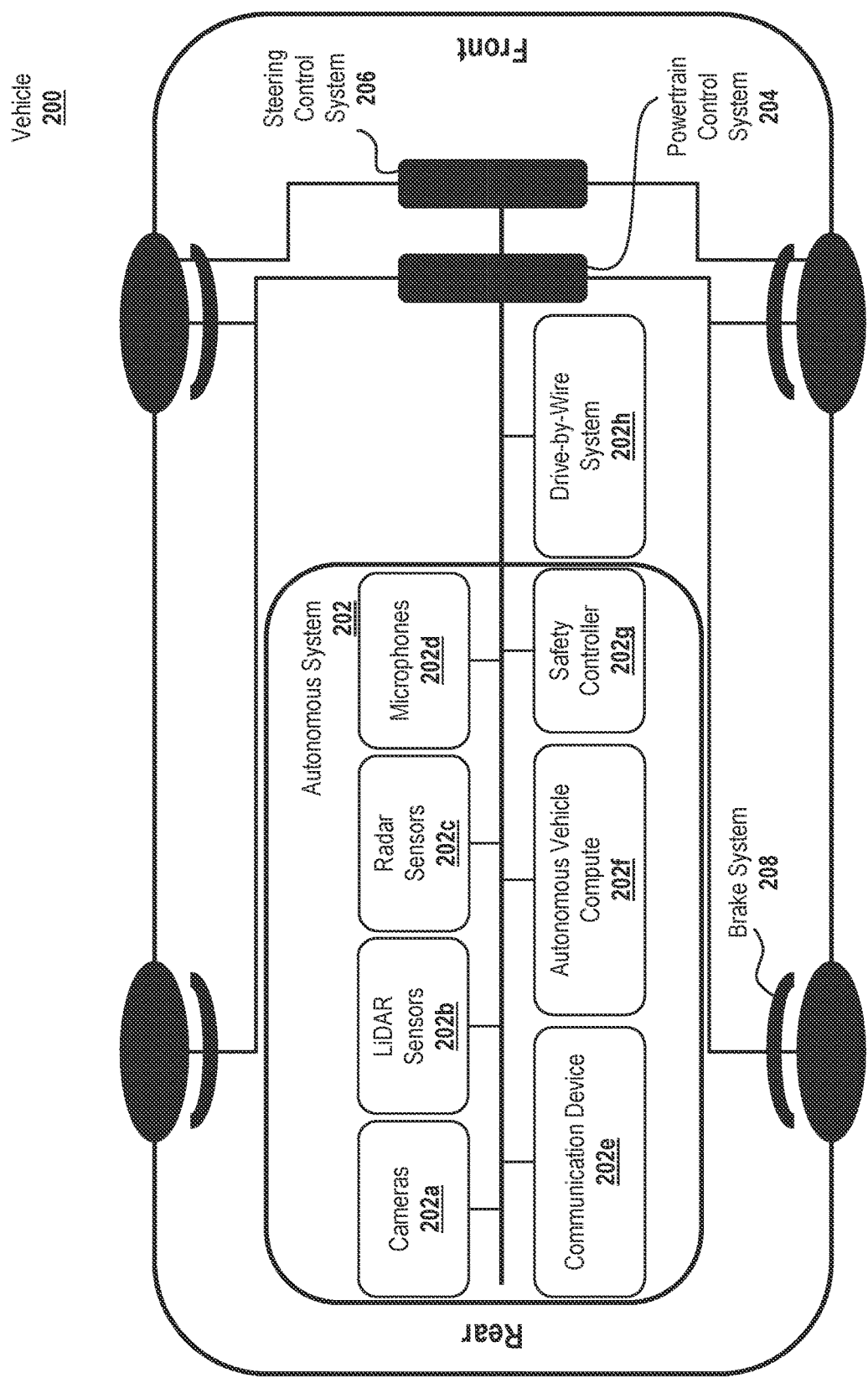
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
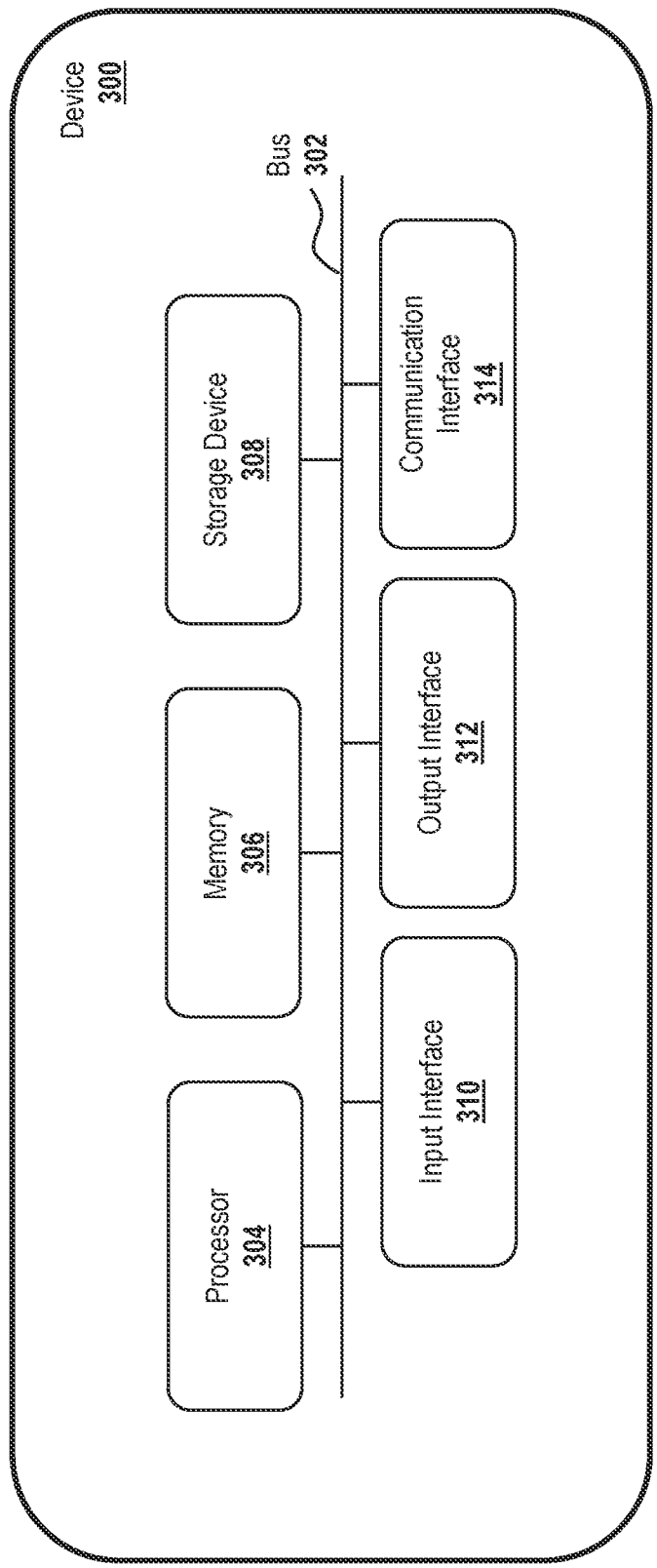
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 306 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
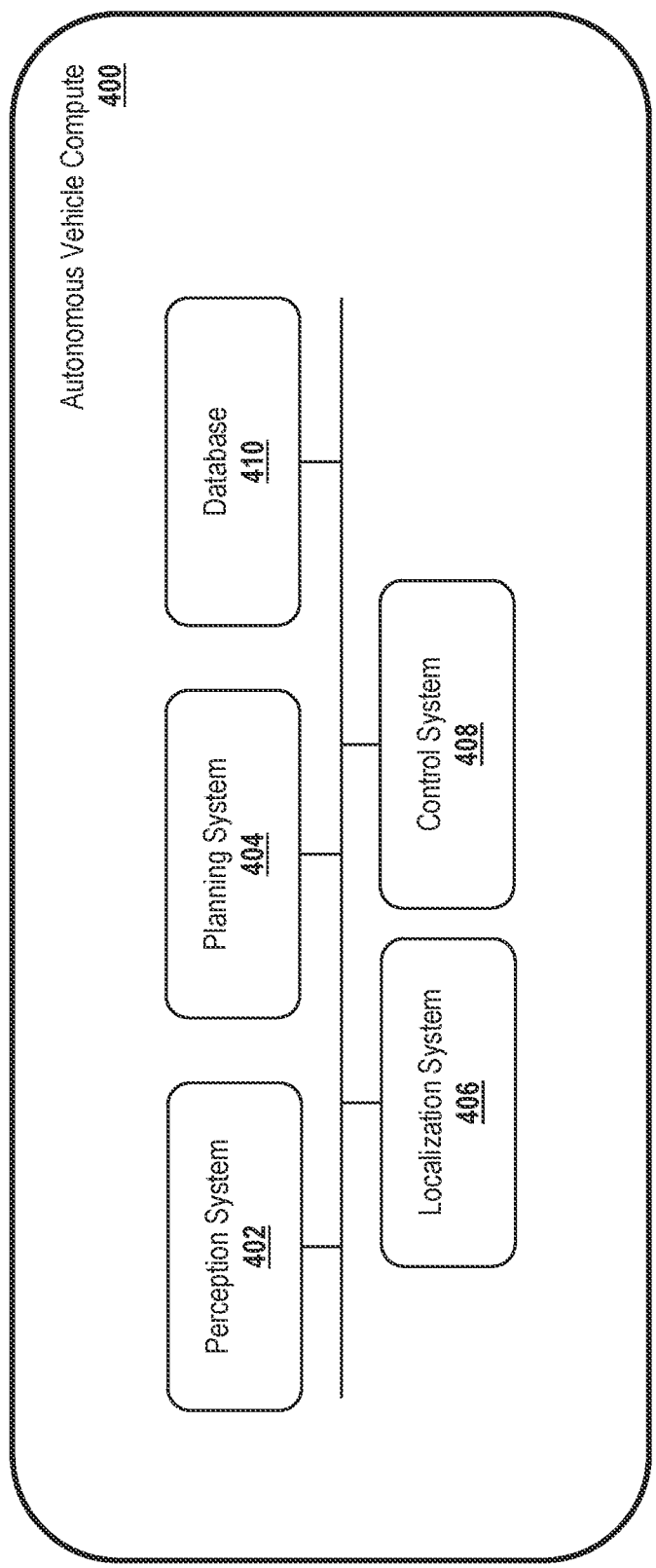
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In accordance with embodiments of the present disclosure, the localization system 406 may implement multiple localization pipelines, each independently determining a location of a vehicle 102. The localization system 406 may use a combination of outputs from distinct pipelines to determine the predicted location of the vehicle 102. Further details regarding use of multiple localization pipelines to predict location are described with reference to FIGS. 5A-6, below.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5A:
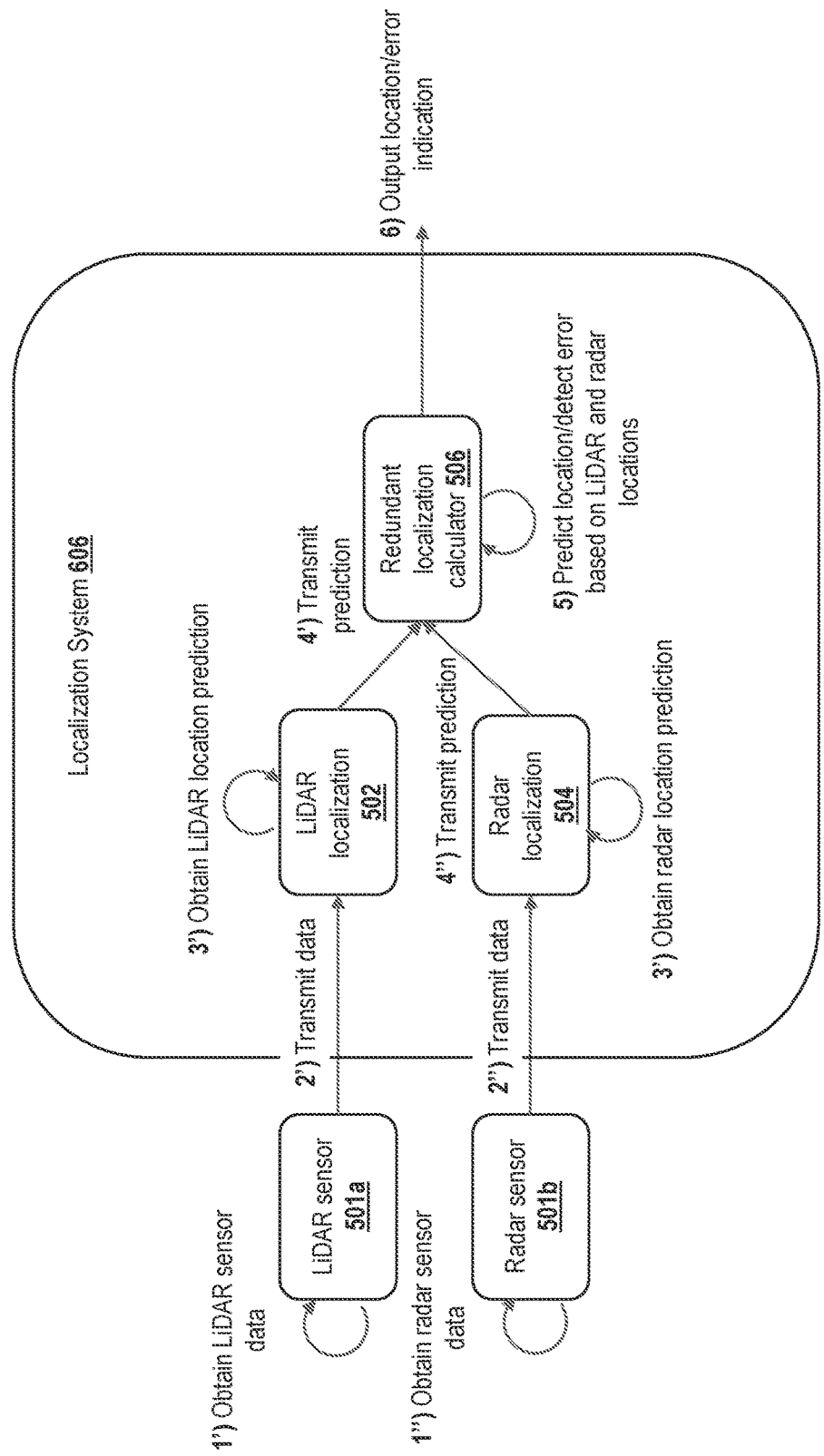
FIG. 5A is a block diagram illustrating example interactions for vehicle location using combined inputs of redundant localization pipelines.
Figure 5B:
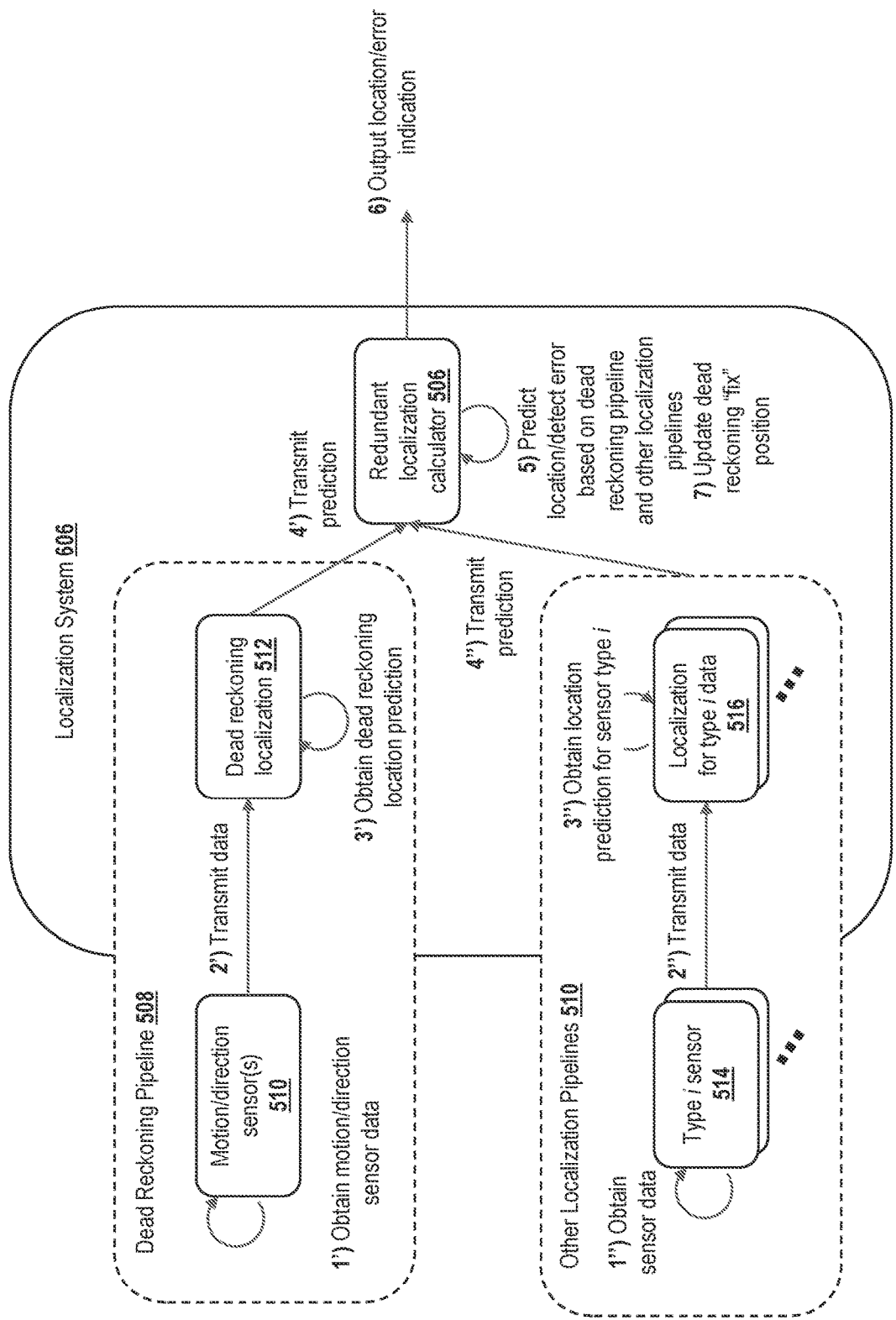
FIG. 5B is a block diagram illustrating example interactions for vehicle location using combined inputs of redundant localization pipelines, including a dead reckoning-based localization pipeline.

With reference to FIGS. 5A and 5B, example interactions will be described for predicting location based on the outputs of multiple redundant localization pipelines. Specifically, FIG. 5A depicts example interactions for predicting location based on a combination of LiDAR-based and radar-based pipelines. FIG. 5B depicts example interactions for predicting location based on a dead reckoning-based localization pipeline, and two or more additional localization pipelines.

In FIGS. 5A-5B, prime notation (e.g., 1' and 1") are intended to represent independent interactions. These interactions may occur simultaneously, partly simultaneously, or at different times. Accordingly, no ordering should be inferred between interactions having different prime notation marks, except that (in the illustrative example of these figures) interactions having a prime notation mark can generally be assumed to occur prior to higher-numbered interactions without prime notation marks. For example, interactions (4') and (4") may be assumed, in this example, to occur prior to interactions (5) and (6).

The interactions of FIG. 5A begin at (1') and (1"), where a localization system 606 (which may be the same as or similar to localization system 606 described above) obtains both LiDAR and radar sensor data from LiDAR and radar sensors 501a and 501b, respectively. The LiDAR data is illustratively obtained from LiDAR sensors 202b, while the radar sensor data is illustratively obtained from radar sensors 202c. The data may represent reflections (e.g., of light or radio waves, respectively) off of nearby objects. The data may be organized in various ways, such as a point cloud, raster data, a listing of points, etc. Each sensor then transmits, at (2') and (2") its respective data to a respective localization process: specifically, the lidar localization process 502 and the radar localization process 504.

At (3') and (3"), each of the LiDAR and radar localization processes 502 and 504 obtains a location prediction based on the respective sensor data. A variety of techniques are known in the art to detect location based on LiDAR and radar sensor data. For example, both the LiDAR and radar localization processes 502 and 504 may implement Monte Carlo localization based on the respective data. To facilitate Monte Carlo localization, the localization system 606 may be provided with access to base maps in a current geographic area reflecting expected sensor readings at various locations within the area. Base maps may be stored, for example, in the database 410.

Monte Carlo localization is a known technique, and thus need not be described in detail herein. However, in brief, Monte Carlo localization uses recursive Bayesian estimation to predict possible locations of a vehicle (or other moving device) based on a map of an area, movement within the area, and past possible locations. Initially, a vehicle (e.g., one or more systems of a vehicle that is the same as, or similar to, vehicles 102 and/or vehicle 200) may assume a uniform distribution of possible locations within an area. The vehicle may then obtain sensor data, and compare the sensor data to a map of the area (e.g., the sensor data that would be expected were the vehicle at a given location in the map). The vehicle can then update its distribution of possible locations in order to give higher weight to locations in the map area whose expected sensor data aligns with the obtained sensor data. For example, if the sensor data indicates a tree having a particular shape, the vehicle may provide higher weight to locations within the map that are proximate to a tree of that shape. The vehicle can further resample the possible locations, clustering possible locations around those locations previously given higher weight. Thereafter, the vehicle can move, obtain new sensor data, and determine whether that new sensor data is consistent with movement from any of the past possible locations. If so, higher weight is given to those past possible locations, and resampling occurs again. This process can continue until the possible locations converge on a predicted location of the vehicle. Monte Carlo localization is also sometimes referred to as particle filter localization.

When using Monte Carlo localization, the output of each of LiDAR localization 502 and radar localization 504 may be, for example, a centroid of possible locations determined from each type of localization. In some embodiments, the output may further include additional data, such as statistical measurements of the possible locations (e.g., measurements of dispersion).

At (4') and (4"), the predicted locations from each localization pipeline (referring generally to the respective sensors and localization processes) are passed into a redundant localization calculator 506, which may represent code executable by the localization system 606 to predict a location of the vehicle (e.g., according to the algorithm 600 of FIG. 6, discussed below). The calculator 506, in turn, predicts a location of the vehicle, and/or indicates an error state, based on the respective LiDAR and radar location predictions.

In one embodiment, the redundant localization calculator 506 first operates to detect whether an error state exists, based on the respective predicted locations from each localization pipeline. For example, the calculator 506 may determine that an error state exists whenever the locations are over a threshold distance apart (or, conversely, that no error state exists if the locations are within a threshold distance of one another). In one embodiment, the threshold distance is static and preconfigured. In another embodiment, the threshold distance is dynamic based on current conditions, which may be characterized by one or more of vehicle speed and error tolerance (e.g., as a function of lane width, crowdedness of an area, etc.). In one example, the threshold distance may be proportional to vehicle speed, reflecting for example that greater deviation may exist for higher movement speeds. In another example, the threshold distance may be inversely proportional to vehicle speed, reflecting for example the increased safety risk of traveling at high speeds. Similarly, the threshold distance may be varied according to error tolerance, such as by reducing in crowded areas (e.g., with many stationary and/or mobile objects) or in areas where route deviation is required to be minimal (e.g., in a narrow lane). In some instances, dynamic threshold parameters may be empirically determined based on these or other factors, and localization system 606 may be programmed to implement such empirically determined parameters, and determine the threshold distance based on such parameters.

In the instance that an error state exists, localization system 606 may be configured to take corrective and/or ameliorative action, such as issuing a warning, stopping the vehicle, moving to a safe location, etc. Error handling is discussed in more detail in FIG. 6, below.

In the instance that no error state exists, localization system 606 determines a predicted location based on the input predictions. In one embodiment, the predicted location may be selected from among those provided by the pipelines, based on factors such as expected accuracy of outputs of the pipelines, past vehicle locations, and the like. For example, the calculator 506 may select the LiDAR-based location prediction as the current predicted vehicle location, based on an expected higher accuracy of LiDAR-based localization than radar-based localization. In other embodiments, the predicted location may be set based on an aggregate of the output of multiple pipelines, such as an average location. The average may be weighted, for example, based on the expected accuracy of outputs of each pipeline. In still other embodiments, metadata for each input localization prediction may be used to establish a predicted vehicle location. For example, inputs may be weighted according to their predicted independent accuracy, which may be measured, e.g., based on dispersion of estimates used to produce each input localization prediction.

Thereafter, redundant localization calculator 506 can output a location indication and/or error indication. As discussed above, the location indicated can then be used to control various aspects of the vehicle, such as in planning routes 106.

While FIG. 5A is discussed with respect to two localization pipelines (e.g., LiDAR and radar-based pipelines), embodiments of the present disclosure may also operate based on three or more pipelines. One example set of interactions for utilizing three or more independent localization pipelines is shown in FIG. 5B. Specifically, in FIG. 5B, the set of localization pipelines includes a dead reckoning pipeline 508 and two or more additional pipelines 510. (While FIG. 5B depicts two or more additional pipelines 510 such that a total of at least three pipelines is implemented, in some embodiments dead reckoning may be used in conjunction with one other additional pipeline.)

Dead reckoning, as is known in the art, involves calculating a current position by using a previously determined position (sometimes referred to as a "fix") and estimations of speed, direction, and elapsed time. For example, a vehicle starting at a given position and heading due north at a speed of 100 km/h for one hour would be expected to arrive at a position 100 km due north of the given position. One benefit of dead reckoning is that it inherits the precision of inputs used (e.g., fix, speed, direction, and elapsed time), and tends not to be relatively resilient to randomness. That is, dead reckoning localization is not likely to indicate drastic location changes unless speed, direction, and elapsed time support such drastic changes. However, dead reckoning is often low in accuracy, particularly over long distances, as small inaccuracies in inputs (particularly speed and direction) are cumulative over multiple calculations. Accordingly, it may be insufficient to rely on dead reckoning alone to indicate location. Nevertheless, these characteristics enable dead reckoning to be beneficially combined with other localization pipelines, such as LiDAR, which can often be highly accurate but occasionally imprecise.

The process for implementing a dead reckoning pipeline 508 is shown in more detail in FIG. 5B. Specifically, at (1'), motion and directional sensors 510 obtain motion and direction data for the vehicle, which is passed to the dead reckoning localization process 512, at (2"). The motion and directional data may include, for example, a speedometer reading, wheel telemetry (e.g., how far a steering wheel is turned), compass bearing information, tilt sensors, and the like. For example, the motion and directional data may indicate that a vehicle is proceeding on a given course (e.g., due north) at a given speed (e.g., 100 km/h).

At (3'), the dead reckoning localization process 512 obtains a dead reckoning location prediction based on the input data, as well as a previous location of the vehicle. The previous location may be established, for example, based on a prior implementation of the interactions of FIG. 5B, or based on an initialization value (e.g., a GPS location on vehicle startup). More specifically, the dead reckoning position can be obtained by modifying the previous location based on the speed, direction, and time elapsed since the previous location was established, in accordance with known techniques of dead reckoning. The dead reckoning location prediction is then transmitted to the redundant localization calculator 506, at (4').

As noted above, in addition to implementation of the dead reckoning pipeline 508, localization system 606 implements two or more other localization pipelines 510. The operation of each pipeline may be generally similar to the LiDAR-based and radar-based localization pipelines discussed above. More specifically, each pipeline may, at (1"), obtain sensor data for a given type of sensor 514 (denoted in FIG. 5B as "type i"), transmit that sensor data to a localization process 516 for the respective data type at (2"), and then obtain a localization prediction for the respective data type at (3"). This localization prediction can then be forward to the redundant localization calculator 506 at (4"). In addition to LiDAR- and radar-based pipelines, the other localization pipelines 510 may include, by way of non-limiting example, GPS-based localization pipelines, landmark-based localization pipelines, camera-based localization pipelines, simultaneous location and mapping (SLAM) localization pipelines including Video SLAM (VSLAM) localization pipelines, acoustic (e.g., sound-based) localization pipelines, and accelerometer-based localization pipelines.

As discussed above, on obtaining location predictions from multiple pipelines, the redundant localization calculator 506, at (5), predicts a location and/or detects an error state based on the obtained location predictions. The interactions of (5) in FIG. 5B are therefore somewhat similar to those of interaction (5) of FIG. 5A. However, the interaction discussed above may be modified to account for the use of these three or more pipelines. For example, an error state may be entered unless a threshold number of (e.g., n of m) pipelines "agree" on a current location. "Agreement" in this context can be indicated, for example, based on being within a threshold distance of one another. For example, where three pipelines exist, the system 606 can implement a pairwise comparison of each pair of pipelines, and indicate an error unless at least, e.g., 2 pipelines indicate a location within a threshold distance of one another. Similarly, where four pipelines exist, the system 606 can implement a pairwise comparison of each pair of pipelines, and indicate an error unless at least, e.g., 3 pipelines indicate a location within a threshold distance of one another. Somewhat similarly, the system 606 may determine agreement when a centroid between a sufficient number of locations can be established that is within a threshold distance of those locations within the sufficient number (e.g., a centroid exists such that it is less than x distance from at least n locations provided by distinct localization pipelines). In other embodiments, outputs of each pipeline may be scored or weighted according to expected accuracy, and an error state may be indicated unless the total score of all "agreeing" localizations exceeds at threshold score. For example, two highlight accurate pipelines may be sufficient to establish location, while three or more less accurate pipelines might be needed to satisfy the threshold score. After establishing a predicted location and/or error state, an indication of that location and/or error state is output at (6).

In addition, when implementing a dead reckoning pipeline 508, the redundant localization calculator 506 can, at (7), update the dead reckoning fix position based on the predicted location. In one embodiment, the fix is updated only when no error state is determined at interaction (5), and the fix is updated to match the location predicted at interaction (5). In another embodiment, the fix is updated only when distinct fix-updating criteria are met. The fix-updating criteria may be set, for example, a similar to the non-error state criteria, but excluding the input corresponding to the dead reckoning pipeline 508. That is, determinations similar to interaction (5) may be conducted, but without the benefit of the dead reckoning location prediction. This can preclude, for example, the accumulation of errors in the dead reckoning prediction. For example, the dead reckoning fix may be updated so long as n of m other pipelines 510 "agree" on a current position. In some instances, fix-updating criteria may require such agreement to exist for a sufficient period or a sufficient number of intervals. For example, the calculator 506 may update the fix to a current predicted location so long as at least two other localization pipelines have agreed as to a current location for at least n seconds, for at least the last n of m intervals of location prediction, etc. By periodically updating the fix, drift and accumulated error in the dead reckoning pipeline 508 can be minimized. Moreover, the dead reckoning pipeline 508 may provide for relative stability of location prediction compared to other localization pipelines 510, enabling accuracy in a predicted location even in the presence of temporary "blips" occurring in other pipelines 510.

Figure 6:
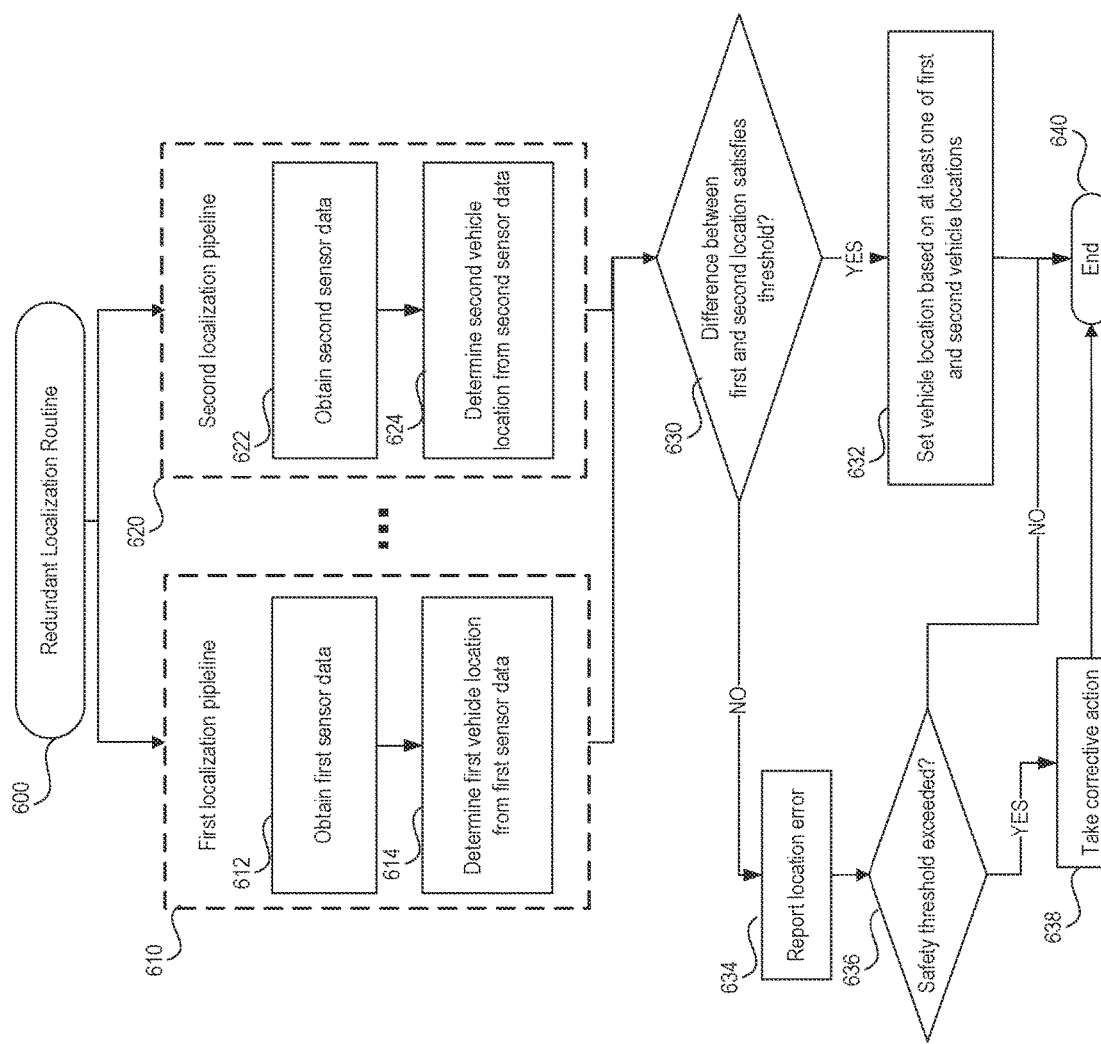
FIG. 6 is flowchart depict an example routine for vehicle location using combined inputs of redundant localization pipelines.

With reference to FIG. 6, an illustrative routine 600 will be described for generating a trained ML model to provide predicted semantic annotations based on inputs including sensor data and unvalidated semantic annotations. The routine 600 may be implemented, for example, by the localization system 606.

The routine 600 begins by implementation of at least two localization pipelines, shown in FIG. 6 as first localization pipeline 610 and second localization pipeline 620. As discussed above, examples of localization pipelines include LiDAR-based pipelines, radar-based pipelines, GPS-based localization pipelines, landmark-based localization pipelines, camera-based localization pipelines, simultaneous location and mapping (SLAM) localization pipelines including Video SLAM (VSLAM) localization pipelines, acoustic (e.g., sound-based) localization pipelines, accelerometer-based localization pipelines, and dead reckoning-based pipelines. Each pipeline 610 and 620 illustratively obtains sensor data regarding a location and/or movement of a vehicle 102, as shown at block 612 and 622, respectively. Each pipeline 610 and 620 further uses such sensor data to determine a predicted location of the vehicle 102, at blocks 614 and 624, respectively. For example, each pipeline may include comparing the sensor data to expected data at potential locations, and estimating a likelihood of obtaining the sensor data at each potential location in view of past movement, such as via Monte Carlo localization as discussed above. In other examples, sensor data may be used to directly estimate location without reference to past movement, such as via GPS-based localization as is known in the art. In still other examples, sensor data may be used to estimate location solely with reference to movement from a fixed point, such as via dead reckoning-based localization. In one embodiment, each pipeline 610 and 620 is utilizes a different type of sensor data, such that the location predictions from the pipelines 610 and 620 are completely independent. In another embodiment, two or more pipelines utilize the same sensor data (or a partially overlapping set of sensor data), processing via different localization algorithms. While two localization pipelines are shown in FIG. 6, the routine 600 may include any two or more pipelines. In one embodiment, the particular pipelines implemented can be selected to provide for combine accuracy, precision, and resilience when implementing the routine 600. For example, a localization pipeline using a Monte Carlo localization process may be combined with a localization pipeline based on dead reckoning to address a potential for random errors in Monte Carlo localization (e.g., "jumping" in predicted location).

At block 630, the localization system 606 compares the predicted locations from each pipeline 610 and 620 to determine whether the differences between the two locations satisfy a threshold value. In one embodiment, the threshold value is static (e.g. 10 centimeters, 1 meter, etc.). In another embodiment, the threshold value is dynamic based on other factors, such as vehicle speed, location crowdedness, lane width. Various techniques for quantifying these factors are known in the art. For example, a vehicle speedometer may track speed, lane tracking cameras may track lane width, LiDAR sensor, radar sensors, or cameras may identify nearby objects, etc. The system 606 may illustratively be pre-configured to determine the threshold value based on a weighted combination of these or other factors.

Where two pipelines 610 and 620 are implemented, block 630 may evaluate to true if both predicted locations are within the threshold from one another. Where more than two pipelines are implemented, block 630 may evaluate to true when the total of all predicted locations from all pipelines satisfies aggregate criteria for the locations. Illustratively, the aggregate criteria may specify that the block evaluates to true when n of m pipelines provide a location within a threshold distance of one another, or when a total score or weight among all pipelines who "agree" as to current location is a threshold amount (with individual locations being scored or weighted, e.g., according to the predicted accuracy or reliability of the output of that pipeline). As noted above, "agreement" may indicate, for example, that a pairwise comparison between a pair of outputs results in a value below the threshold distance, or that two outputs are within a threshold distance of a third location, such as a centroid of all outputs that are within a threshold distance of one another.

When block 630 evaluates to true, the routine 600 proceeds to block 632, where the vehicle location is set based on at least one of the input locations. In one embodiment, each pipeline is assigned a preference or an expected accuracy value, and the location is set to the location with the highest preference or expected accuracy. In another embodiment, the location may be set based on an aggregate of the output of multiple pipelines, such as an average location. The average may be weighted, for example, based on the expected accuracy of outputs of each pipeline. Where only a subset of locations are used for the purposes of satisfying block 630 (e.g., where two of three pipelines "agree"), the location may be set from that subset, such that the localization system 606 does not set the vehicle location based on locations from non-agreeing pipelines. The routine 600 then ends at block 640.

When block 630 evaluates to false, the routine 600 proceeds to block 634, where the localization system 606 reports a location error. Reporting a location error may include, for example, notifying a human operator, logging the error to a log file, or the like.

In general, a single location error may not be detrimental to operation of a vehicle. For example, localization may occur at relatively rapid intervals (e.g., every few seconds, multiple times a second, etc.), such that, e.g., a single error does not cause issue during operation. However, the vehicle 102 may be configured with a safety threshold, such that failure to establish a location for a threshold period causes corrective or ameliorative action to be taken. Accordingly, the routine 600 proceeds to block 636, where the localization system 606 determines whether a safety threshold has been exceeded. The threshold may generally indicate a maximum time period, or a maximum number of localization intervals (e.g., each corresponding to an implementation of the routine 600) since last successfully setting the vehicle location (e.g., at block 632). In one embodiment, the threshold is static and pre-configured. For example, the threshold may be set to 1 second, 2 seconds, etc. In another embodiment, the threshold is dynamic, based on factors such as vehicle speed, location crowdedness, lane width. For example, the threshold may decrease as speed or crowdedness increase, and decrease as lane width decreases. If this threshold is not exceeded, the routine 600 then ends at block 640. However, if the threshold has been exceeded—e.g., if successful localization has not occurred for the threshold number of intervals, seconds, etc.—block 636 evaluates to false, and the routine 600 proceeds to block 638 where the vehicle 102 takes corrective action. For example, the vehicle 102 may issue an urgent notification to a human operator, slow in speed, pull to a safe location (e.g., a shoulder), or a combination thereof. In this way, if localization fails for a sufficient period, safety of passengers, the vehicle, and nearby people and objects can be ensured. The routine 600 then ends at block 640.

While FIG. 6 depicts an example routine 600, various modifications of such a routine are contemplated herein. For example, as noted above, when a dead reckoning-based localization pipeline is implemented, it may be preferable to update the "fix" (e.g., initial position) for dead reckoning calculations. In one embodiment, the "fix" is updated at each implementation of block 632, to match the vehicle location. In another embodiment, the routine 600 may be modified to include additional logic, e.g., subsequent to block 630. For example, the fix for dead reckoning may be updated so long as a sufficient number of other (e.g., not dead reckoning-based) localization pipelines "agree" as to a present location. In some examples, the fix may be updated only when a sufficient number of other localization pipelines agree as to a present location for a threshold period of time. Thus, the locations of other pipelines may be used to update an initial dead reckoning location, such that the potential for cumulative error in dead reckoning is reduced or eliminated.

As another example, while described in terms of localization, the routine 600 may additionally or alternatively implement pose detection, to detect pose aspects such as the orientation of a vehicle. Similarly to as described above, multiple pose pipelines can be implemented based on different types of sensor data (e.g., LiDAR, radar, odometry, etc.), and outputs of each pipeline can be compared (e.g., at block 630) to determine whether the outputs satisfy a threshold value. In the instance that the outputs do satisfy the value, a vehicle pose can be updated. Otherwise, the vehicle 102 may record or report errors, take corrective or ameliorative action, etc. Thus, discussion above with respect to location detection should be understood to potentially also apply to pose detection. In some embodiments, the routine may be modified to implement both pose and location detection, or multiple instances of the routine 600 may be combined such that a first instance detects pose and another detects location (based, e.g., on common sensor data).

Furthermore, while a single instances of routine 600 is described above, one skilled in the art will appreciate that a localization system 606 may implement multiple instances, which may occur at least in part concurrently. For example, a new instance of the routine 600 may occur at each interval, while prior instances of the routine 600 are still occurring. Thus, it should be understood that routine 600 may reflect only a small portion of total operations of, e.g., a localization system 606 at any given time.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims.

In addition, when we use the term "further comprising," in the foregoing description or following claims, what follows this phrase can be an additional step or entity, or a sub-step/sub-entity of a previously-recited step or entity.

What is claimed is:

1. A method, comprising:
    implementing, by at least one processor of a vehicle, a first localization pipeline to determine a first vehicle location, wherein implementing the first localization pipeline comprises:
        obtaining, from a first sensor of a first sensor type, first sensor data of a first type associated with at least one of a location or movement of the vehicle, and
        determining, based on the first sensor data of the first type associated with at least one of the location or movement of the vehicle, the first vehicle location;
    implementing, by the at least one processor of the vehicle, a second localization pipeline independent of the first localization pipeline to determine a second vehicle location, wherein implementing the second localization pipeline comprises:
        obtaining from a second sensor of a second sensor type, second sensor data of a second type associated with at least one of the location or movement of the vehicle, and
        determining, from the second sensor data of the second type associated with at least one of the location or movement of the vehicle, the second vehicle location independently of the first sensor data of the first type;
    comparing, by the at least one processor of the vehicle, the first vehicle location and second vehicle location to determine whether a difference between the first vehicle location and the second vehicle location satisfies a threshold, wherein the threshold is dynamically set based on an amount of time elapsed since setting the last known location of the vehicle; and
    in response to determining that the difference between the first vehicle location and the second vehicle location satisfies the threshold, setting, by the at least one processor of the vehicle, a known location of the vehicle based on at least one of the first vehicle location and the second vehicle location.

2. The method of claim 1, wherein each of the first sensor type and the second sensor type is at least one of LiDAR, radar, camera, accelerometer, global positioning system (GPS), and speedometer.

3. The method of claim 1, wherein each of the first localization pipeline and the second localization pipeline is at least one of LiDAR -based localization pipeline, radar-based localization pipeline, camera-based localization pipeline, GPS-based localization pipeline, accelerometer-based localization pipeline, and dead reckoning pipeline.

4. The method of claim 1, wherein the threshold is dynamically set based on a speed of the vehicle.

5. The method of claim 1, wherein setting the known location of the vehicle based on at least one of the first vehicle location and the second vehicle location comprises:
    setting the known location of the vehicle to match the first vehicle location.

6. The method of claim 1 further comprising:
    implementing a third localization pipeline to determine a third vehicle location, wherein implementing the third localization pipeline comprises:
        obtaining from a third sensor of a third type, third sensor data associated with at least one of the location or movement of the vehicle, and determining, from the third sensor data associated with at least one of the location or movement of the vehicle, the third vehicle location; and wherein comparing the first vehicle location and second vehicle location to determine whether the difference between the first vehicle location and the second vehicle location satisfies the threshold comprises:

making pairwise comparisons between each of the first, second, and third vehicle locations to determine that at least two of the first, second, and third vehicle locations fall within a threshold distance of one another.

7. The method of claim 6, wherein the threshold distance is set based on the localization pipelines used to determine the at least two vehicle locations compared within the pairwise comparison of the at least two vehicle locations.

8. The method of claim 1 further comprising:

implementing a third localization pipeline to determine a third vehicle location using dead reckoning, wherein implementing the third localization pipeline comprises:

determining an initial location and determining the third vehicle location based on a speed and direction of movement from the initial location; and resetting the initial location to the known location of the vehicle in response to determining that the difference between the first vehicle location and the second vehicle location has satisfied the threshold during each period of a set of past periods.

9. A system, comprising:

at least one processor associated with a vehicle, and at least one non-transitory storage media storing instructions that, when executed by the at least one processor, cause the at least one processor to:

implement a first localization pipeline to determine a first vehicle location, wherein implementing the first localization pipeline comprises:

obtaining, from a first sensor of a first sensor type, first sensor data of a first type associated with at least one of a location or movement of the vehicle, and determining, based on the first sensor data of the first type associated with at least one of the location or movement of the vehicle, the first vehicle location;

a second localization pipeline independent of the first localization pipeline to determine a second vehicle location, wherein implementing the second localization pipeline comprises:

obtaining from a second sensor of a second sensor type, second sensor data of a second type associated with at least one of the location or movement of the vehicle, and determining, from the second sensor data of the second type associated with at least one of the location or movement of the vehicle, the second vehicle location independently of the first sensor data of the first type;

compare the first vehicle location and second vehicle location to determine whether a difference between the first vehicle location and the second vehicle location satisfies a threshold, wherein the threshold is dynamically set based on an amount of time elapsed since setting the last known location of the vehicle; and in response to determining that the difference between the first vehicle location and the second vehicle location satisfies the threshold, set a known location of the vehicle based on at least one of the first vehicle location and the second vehicle location.

10. The system of claim 9, wherein the threshold is dynamically set based on a speed of the vehicle.

11. The system of claim 9, wherein setting the known location of the vehicle based on at least one of the first vehicle location and the second vehicle location comprises:

setting the known location of the vehicle to an average of the first vehicle location and the second vehicle location.

12. The system of claim 11, wherein the average of the first location and the second vehicle location is weighted according to an accuracy of the first location and an accuracy of the second location.

13. The system of claim 9, wherein the instructions further cause the at least one processor to:

implement a third localization pipeline to determine a third vehicle location, wherein implementing the third localization pipeline comprises:

obtaining from a third sensor of a first third type, third sensor data associated with at least one of the location or movement of the vehicle, and determining, from the third sensor data associated with at least one of the location or movement of the vehicle, the third vehicle location; and wherein comparing the first vehicle location and second vehicle location to determine whether the difference between the first vehicle location and the second vehicle location satisfies the threshold comprises:

making pairwise comparisons between each of the first, second, and third vehicle locations to determine that at least two of the first, second, and third vehicle locations fall within a threshold distance of one another.

14. The system of claim 13, wherein the threshold distance is set based on the localization pipelines used to determine the at least two vehicle locations compared within the pairwise comparison of the at least two vehicle locations.

15. The system of claim 9, wherein the instructions further cause the at least one processor to:

implement a third localization pipeline to determine a third vehicle location using dead reckoning, wherein implementing the third localization pipeline comprises:

determining the third vehicle location based on a speed and direction of movement from an initial location; and resetting the initial location to the known location of the vehicle in response to determining that the difference between the first vehicle location and the second vehicle location has satisfied the threshold during each period of a set of past periods.

16. The system of claim 9, wherein the threshold is dynamically set based on a crowdedness of an area surrounding the vehicle.

17. The system of claim 9, wherein the threshold is dynamically set based on a width of a current lane of the vehicle.

18. At least one non-transitory storage media storing instructions that, when executed by a computing system comprising a processor associated with a vehicle, cause the computing system to:

implement a first localization pipeline to determine a first vehicle location, wherein implementing the first localization pipeline comprises:

obtaining, from a first sensor of a first sensor type, first sensor data of a first type associated with at least one of a location or movement of the vehicle, and determining, based on the first sensor data of the first type associated with at least one of the location or movement of the vehicle, the first vehicle location;

implement a second localization pipeline independent of the first localization pipeline to determine a second vehicle location, wherein implementing the second localization pipeline comprises:

obtaining from a second sensor of a second sensor type, second sensor data of a second type associated with at least one of the location or movement of the vehicle, and determining, from the second sensor data associated with at least one of the location or movement of the vehicle, the second vehicle location independently of the first sensor data of the first type;

compare the first vehicle location and second vehicle location to determine whether a difference between the first vehicle location and the second vehicle location satisfies a threshold, wherein the threshold is dynamically set based on an amount of time elapsed since setting the last known location of the vehicle; and in response to determining that the difference between the first vehicle location and the second vehicle location satisfies the threshold, set a known location of the vehicle based on at least one of the first vehicle location and the second vehicle location.

19. The at least one non-transitory storage media of claim 18, wherein the instructions further cause the computing system to:

implement a third localization pipeline to determine a third vehicle location, wherein implementing the third localization pipeline comprises:

obtaining from a third sensor of a first third type, third sensor data associated with at least one of the location or movement of the vehicle, and determining, from the third sensor data associated with at least one of the location or movement of the vehicle, the third vehicle location; and wherein comparing the first vehicle location and second vehicle location to determine whether the difference between the first vehicle location and the second vehicle location satisfies the threshold comprises:

making pairwise comparisons between each of the first, second, and third vehicle locations to determine that at least two of the first, second, and third vehicle locations fall within a threshold distance of one another.

20. The at least one non-transitory storage media of claim 18, wherein the threshold is set based on the localization pipelines used to determine the at least two vehicle locations compared within the comparison of the at least two vehicle locations.

21. The at least one non-transitory storage media of claim 18, wherein the instructions further cause the computing system to:

implement a third localization pipeline to determine a third vehicle location using dead reckoning, wherein implementing the third localization pipeline comprises:

determining the third vehicle location based on a speed and direction of movement from an initial location; and resetting the initial location to the known location of the vehicle in response to determining that the difference between the first vehicle location and the second vehicle location has satisfied the threshold during each period of a set of past periods.

* * * * *